US012357079B2

(12) United States Patent
Gottenbos et al.

(10) Patent No.: US 12,357,079 B2
(45) Date of Patent: Jul. 15, 2025

(54) FULL BRISTLE FIELD JET-BRUSH COMBINATION

(71) Applicant: KONINKLIJKE PHILIPS N.V., Eindhoven (NL)

(72) Inventors: Bart Gottenbos, Budel (NL); Quintin Oliver Williams, Eersel (NL); Mark Thomas Johnson, Arendonk (BE); Lutz Christian Gerhardt, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 609 days.

(21) Appl. No.: 17/640,896

(22) PCT Filed: Sep. 4, 2020

(86) PCT No.: PCT/EP2020/074764
§ 371 (c)(1),
(2) Date: Mar. 7, 2022

(87) PCT Pub. No.: WO2021/043978
PCT Pub. Date: Mar. 11, 2021

(65) Prior Publication Data

US 2022/0330687 A1 Oct. 20, 2022

(30) Foreign Application Priority Data

Sep. 5, 2019 (EP) .................................... 19195519

(51) Int. Cl.

| | |
|---|---|
| ***A61C 17/22*** | (2006.01) |
| ***A46B 9/02*** | (2006.01) |
| ***A46B 9/04*** | (2006.01) |

(52) U.S. Cl.
CPC ................ *A46B 9/04* (2013.01); *A46B 9/025* (2013.01); *A61C 17/222* (2013.01)

(58) Field of Classification Search
CPC .. A46B 13/02; A46B 9/04; A46B 7/06; A61C 17/34; A61C 17/222
See application file for complete search history.

(56) References Cited

U.S. PATENT DOCUMENTS

| | | | |
|---|---|---|---|
| 2,743,042 | A | 4/1956 | Burgin |
| 6,766,549 | B2 | 7/2004 | Klupt |

(Continued)

FOREIGN PATENT DOCUMENTS

| | | | | |
|---|---|---|---|---|
| GB | 2067396 A1 | 7/1982 | | |
| WO | WO-9205721 A * | 4/1992 | ......... | A46B 11/0017 |
| WO | 20060009522 A1 | 1/2006 | | |

OTHER PUBLICATIONS

International Search Report and Written Opinion Dated Dec. 8, 2020 for International Application No. PCT/EP2020/0740764 Filed Sep. 4, 2020.

*Primary Examiner* — Michael D Jennings

(57) ABSTRACT

Provided is a brush head for an oral cleaning device for cleaning teeth with a combination of brushing and emitting of a cleaning agent. The brush head comprises a bristle set for brushing the teeth and a nozzle for emitting the cleaning agent. When actuating the bristle set from a first configuration, which is optimized for brushing, to a second configuration, which is optimized for emitting of a cleaning agent, at least a part of the bristle 5 set is moved away from the nozzle and/or away from a path of the cleaning agent when being emitted from an orifice of the nozzle.

19 Claims, 5 Drawing Sheets

(56) References Cited

U.S. PATENT DOCUMENTS

| | | | |
|---|---|---|---|
| 6,938,293 | B2 | 9/2005 | Eliav et al. |
| 8,171,591 | B2 | 5/2012 | Hall et al. |
| 9,144,298 | B2 | 9/2015 | Fattori |
| 9,987,109 | B2 | 6/2018 | Sokol et al. |
| 10,477,952 | B2 | 11/2019 | Jimenez et al. |
| 2007/0174978 | A1 | 8/2007 | Eliav et al. |
| 2016/0296309 | A1 | 10/2016 | Schmalhurst et al. |
| 2017/0318951 | A1 | 11/2017 | Taghvai |

* cited by examiner

FULL BRISTLE FIELD JET-BRUSH COMBINATION

This application is the U.S. National Phase application under 35 U.S.C. § 371 of International Application No. PCT/EP2020/074764, filed on Sep. 4, 2020, which claims the benefit of EP Application Serial No. 19195519.4, filed Sep. 5, 2019. These applications are hereby incorporated by reference herein.

FIELD OF THE INVENTION

The present invention relates to a brush head for an oral cleaning device for cleaning teeth with a combination of brushing and emitting of a cleaning agent, an oral cleaning device comprising a brush head for cleaning teeth with a combination of brushing and emitting of a cleaning agent, and a method for cleaning teeth with a combination of brushing and emitting of a cleaning agent.

BACKGROUND OF THE INVENTION

Combining a toothbrush with an oral irrigation jet for emitting fluid is a valuable product proposition aimed at improved cleaning of teeth. The bristles of the toothbrush are used for brushing the teeth, whereas the emitted fluid can be used, for example, for additional cleaning of interdental spaces or gum. Irrigators and micro-droplet devices are believed to perform interdental cleaning and deliver interdental gum health certainly as good as string floss. Typically, the orifice of the irrigation jet is placed within the bristle field of the brush. Thus, the jet position is instinctively clear and always at the location of brushing. At the jet position no bristles are located to make room for the nozzle, but also to give free way for the jet of emitted fluid, as blocking bristles could reduce the jetting efficacy.

A disadvantage of such a configuration is that part of the bristle field is sacrificed for giving room for the nozzle and the emitting of the fluid. This likely reduces the brushing efficacy of the tooth brush. An alternative position of the nozzle outside the brushing field, e.g. at the end of the brush head tip, may solve this issue, but makes the use of the jet less intuitive as the jet is not at the position of brushing in the perception of the user. Thus, the brush head of the tooth brush is no longer comfortable to use.

For these reasons identified by the inventors of the present invention it would be advantageous to have a brush head that combines brushing and emitting of a cleaning agent that does not suffer from the above drawbacks.

WO 2011/094587 A1 discloses an oral care implement having a fluid dispensing system for dispensing an oral care fluid.

U.S. Pat. No. 6,766,549 B2 discloses a toothbrush system with a three-dimensional brushing action and fluid irrigation.

GB 2 067 396 A discloses a reservoir toothbrush.

US 2007/174978 A1 discloses a powered toothbrush including a head containing a rotating or oscillating first bristle carrier and also containing a second bristle carrier movably connected to the head.

WO 2006/095222 A1 discloses a hydraulic system for driving a membrane brush head which includes bristles mounted thereon.

WO 2017/062033 A1 discloses oral care implement including an elongated body comprising a head portion supporting a plurality of tooth cleaning elements and a handle portion.

SUMMARY OF THE INVENTION

It is an object of the present invention to provide a brush head for an oral cleaning device with an improved performance of brushing and emitting of a cleaning agent.

The object of the present invention is solved by the subject matter of the independent claims, wherein further embodiments are incorporated in the dependent claims.

The described embodiments similarly pertain to the brush head for an oral cleaning device for cleaning teeth with a combination of brushing and emitting of a cleaning agent, an oral cleaning device comprising a brush head for cleaning teeth with a combination of brushing and emitting of a cleaning agent, and the method for cleaning teeth with a combination of brushing and emitting of a cleaning agent. Synergetic effects may arise from different combinations of the embodiments although they might not be described in detail.

Further on, it shall be noted that all embodiments of the present invention concerning a method might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

According to a first aspect there is provided a brush head for an oral cleaning device for cleaning teeth with a combination of brushing and emitting of a cleaning agent, the brush head comprising: a platen with a first face, a first bristle set extending from the first face for brushing the teeth, a nozzle comprising an orifice for emitting the cleaning agent from the orifice towards a direction pointing away from the first face of the platen, wherein at least a part of the first bristle set is moveable relative to a path of the cleaning agent from the orifice such that the brush head is configurable to adopt a first configuration in which the path is at least partially blocked by the at least part of the first bristle set, and a second configuration in which the path is cleared of the at least part of the first bristle set.

The term "first configuration" as used herein may refer to the adopted configuration of the brush head prior to brushing the teeth using the brush head. Thus, the term "first configuration" is not intended to refer to a transient covering of the path by bristles during brushing using the brush head. Similarly, the second configuration is not adopted by the bristles transiently uncovering the path during brushing using the brush head.

Each bristle of the at least part of the first bristle set may have a base at which the bristle is hingeably mounted to the platen. The hingeable mounting may permit pivoting of the bristle across the path to adopt the first configuration and away from the path to adopt the second configuration.

Such hingeable mounting may be achieved, for example, by connecting the bristle to the platen via a bearing.

Each bristle of the at least part of the first bristle set may, for example, be biased towards the nozzle such that the brush head is biased to adopt the first configuration. In this case, the second configuration may be adopted by pivoting each of the bristles against the bias.

Alternative ways of moving bristles of the first bristle set relative to the path are also conceivable, as will be explained further herein below.

According to a second aspect, there is provided a brush head for an oral cleaning device for cleaning teeth with a combination of brushing and emitting of a cleaning agent. The brush head comprises a platen with a first face, a first bristle set extending from the first face for brushing the teeth, and a nozzle comprising an orifice for emitting the cleaning agent from the orifice towards a direction pointing away from the first face of the platen. The brush head is configured for moving at least a part of the first bristle set away from the nozzle and/or away from a path of the cleaning agent when being emitted by the orifice and/or of the orifice from a first configuration into a second configuration when the nozzle is activated for an emission of the cleaning agent from the orifice. The brush head is configured for moving at least the part of the first bristle set towards the nozzle and/or towards the path of the cleaning agent and/or of the orifice from the second configuration into the first configuration when the nozzle is deactivated for the emission of the cleaning agent from the orifice.

The brush head uses a combination of brushing and emitting of a cleaning agent for cleaning teeth. The brush head comprises a platen, wherein a nozzle and one or more bristle sets are positioned at a first face of the platen. A second face can be positioned at the opposite side of the platen. Each bristle set comprises a bristle and a connection element, which connects the bristle to the platen. A bristle can comprise a single bristle filament, but it can also comprise a plurality of bristle filaments, which may be arranged and grouped together in one or more bristle tufts. Each bristle set is connected to the platen and extends from the surface of the platen. The bristle can be connected to the platen via a bearing. A nozzle for emitting a cleaning agent is positioned adjacent to a bristle set or inbetween of a plurality of bristle sets. The emitted cleaning agent can be used for irrigation of the mouth and the teeth, especially of interdental spaces or gum, and thus contribute to the cleaning of the teeth in addition to brushing. As cleaning agent, for example water, can be used, with or without additives for cleaning, but also any other kind of liquid, gaseous or even solid fluids or materials may be used, which can be emitted through the nozzle. The cleaning agent can be emitted from the nozzle substantially in the same direction extending away from the surface of the platen as the bristle set. Thus, the bristles are configured such that they can be in a first configuration and in a second configuration, and that they can be actuated from the first to the second configuration, and vice versa. When actuating a first bristle set from the first into the second configuration when the nozzle is activated for the emission of cleaning agent, at least a part of the first bristle set is moved away from the nozzle. Alternatively or in addition, the part of the first bristle set can be moved away from a path, along which the cleaning agent propagates when emitted from an orifice of the nozzle. The bristles can also be moved away from a path, along which at least a part of the nozzle or the orifice propagates, when cleaning agent is emitted from the orifice. When actuating a first bristle set from the second into the first configuration when the nozzle is deactivated for the emission of cleaning agent, the first bristle set moves back in its initial position towards the nozzle and/or towards the path of the cleaning agent and/or towards the path of the orifice. The actuation of the bristles from the second configuration back to the first configuration may be achieved by elastic forces, for example by a spring or by an elastic reversible movement of the bristles or the bristle bearing.

In an embodiment, the nozzle is configured for emitting the cleaning agent along the path away from the platen, and the brush head is configured for at least partially blocking the path in the first configuration, and for clearing the path in the second configuration.

The bristles or at least a part of the first bristle set blocks the path of the emitted cleaning agent or of the orifice of the nozzle at least partially in the first configuration. The bristles can be arranged such that their distal ends form a dense and regular bristle field without comprising an opening of the bristle field at the position of the nozzle. When the bristles are actuated from the first configuration to the second configuration, the bristle field is opened to clear the path in front of the nozzle in the direction of the path of the emitted cleaning agent or of the orifice. Thus, the path is vacant of bristles, it is cleared for the jet of emitted cleaning agent.

In an embodiment, the brush head is configured for brushing the teeth in the first configuration, and the brush head is configured for emitting the cleaning agent in the second configuration.

In the first configuration, the bristles are positioned such that the brush head is optimized for brushing the teeth with a bristle field extending across the complete length of the bristle field, in particular the complete length of the brush head and comprising no spaces vacant of bristles. Thus, efficient brushing is enabled. In the second configuration, the bristles are actuated such that the path of the emitted cleaning agent is cleared and bristles do not obstruct the path. Therefore, the emission of a jet of cleaning agent from the orifice of the nozzle along the path is enabled. The bristles are optimized for brushing while there is no jetting going on, but the brush head of this embodiment makes way for the jet of cleaning agent opening up the bristle field during jet bursting. The additional movement of the bristles at the time of the jet bursts can have additional cleaning efficacy at or around the jet location.

In an embodiment, the brush head is configured for actuating the first bristle set from the first configuration into the second configuration by emitting the cleaning agent from the orifice of the nozzle and/or by moving at least a part of the nozzle away from the platen.

The actuation of the first bristle set from the first to the second configuration can be achieved by the cleaning agent emitted from the orifice of the nozzle. The actuation of the first bristle set can also be achieved by a movement of at least a part of the nozzle away from the platen.

In an embodiment, the nozzle is configured for changing its geometry for emitting the cleaning agent, and the first bristle set is configured for being actuated from the first configuration to the second configuration by a change of the geometry of the nozzle. The first bristle set is configured for being pushed away by the nozzle, and/or the first bristle set is positioned on the changeable geometry of the nozzle and configured for being moved with the change of geometry of the nozzle.

Bristles can be located close to the jet orifice by placing them around the orifice with an angulation towards the orifice opening, or even on the orifice itself. In this way, the tips of the bristles are available for cleaning at the location of the nozzle when no jetting occurs. A change of the geometry of the nozzle can be achieved by for example choosing an elastic material for the nozzle, such as rubber, e.g. silicone rubber, or by design, e.g. a harmonica or telescopic type of expansion, or both. The orifice or another element of the nozzle mechanically expands when cleaning agent is emitted in the jet. The expansion is thus driven by the pressure of the cleaning agent, which is increased to create a jet burst. The expansion moves the bristles out of the way of the jet by a contact of the bristles to the expanding element of the nozzle. A type of nozzle which expands when internally pressurized is a duckbill valve, which is a suitable orifice design for this embodiment. The nozzle enlarges its dimensions while opening up during a jet burst and pushes or moves the bristles out of the way of the jet of cleaning agent.

The bristles can also be integrated in the nozzle itself, for example the elastic duckbill tip, such that the bristles are not connected directly or by means of a bearing to the platen, but such that the bristles are connected via the flexible nozzle to the platen. In this way, an enlargement of the nozzle will cause the bristles to move with the nozzle and clear the path in front of the nozzle.

The nozzle can also be located on a balloon or be part of a balloon. The first bristle set can also be located on a surface of the balloon. The balloon can extend when cleaning agent is emitted room the orifice. This extension of the balloon can lead to a change of the geometric arrangement of at least the tips of the bristles with respect to the orifice of the nozzle. Thus, the tips of the bristles can clear the path of the cleaning agent to be emitted from the orifice.

In an embodiment, the first bristle set is configured for being actuated from the first configuration to the second configuration by the cleaning agent emitted from the orifice of the nozzle.

The orifice can also be a rigid orifice that does not change its geometry upon emitting a jet of cleaning agent. In this embodiment, the cleaning agent emitted from the orifice of the nozzle clears the path the path of the cleaning agent or the path of the orifice. Opening the bristle field and clearing the path can be performed by the jet itself, which can push the bristles out of the way of the jet. A possible disturbance of the jet by contact of the jet with the bristles can be limited by using an appropriate design of the bristles and/or an elastic flexible material for the bristles or the bristle bearing being flexible enough to bend the bristles away easily. The contact with the bristles can be used for shaping the jet like, for example, a spray sheet, for providing a good cleaning efficiency.

In an embodiment, the brush head further comprises a flexible flap between the nozzle and the first bristle set, and the orifice of the nozzle is oriented towards the flexible flap, so that the flexible flap is configured for transferring a momentum from the cleaning agent emitted from the orifice to the first bristle set.

In order to reduce disturbances of the jet and/or to shape the jet, a bristle set can be lined with a flexible flap. The smooth surface of the flexible flap can cause less disturbances to the jet than the bristles. The flexible flap can be moved by the cleaning agent emitted from the orifice and pushed away from the jet, and the bristles are pushed away by the flexible flap.

In an embodiment, the brush head further comprises an actuator configured for actively actuating the first bristle set from the first configuration to the second configuration.

In this embodiment the bristle field covering the nozzle is opened and closed by an actuator, which can be also independent of the actuation of the nozzle. The actuator may be synchronized with the jet emitted from the nozzle, to open and close the orifice at the right time. Thus the jet of cleaning agent is not disturbed, and no energy of the jet is lost by moving the bristles or changing the geometry of the nozzle.

In this embodiment, a separate actuator flexes away the angulated bristles just before the jet burst arrives, and flexes it back when not jetting.

In an embodiment, the actuator is an electrically driven actuator, or the actuator is driven by a pressure and/or a flow of the cleaning agent in a conduit delivering the cleaning agent to the nozzle.

The actuator can be, for example, an electric motor or another electromagnetic device, which uses an electric impulse or current for actuating the bristles from the first configuration to the second configuration and vice versa. Driving the actuator can also be achieved by using either the flow of the cleaning agent and/or the pressure build up when the cleaning agent flows through a conduit on the way to the nozzle. The cleaning agent actuates the actuator before it is emitted through the orifice of the nozzle. In this manner, the bristles are moved when the jet activates and hence automatically open and close at the right time. For using the pressure of the cleaning agent, the actuator can be a balloon type actuator, which deforms when the pressure of the cleaning agent increases. A small expandable section of the conduit wall can be used for forming the balloon when the cleaning agent is forced through the conduit. The deformation is in such a manner as to move the bristles away from the jet. In a further embodiment the maximum deformation can be kept very small, as only a tiny expansion is needed to tilt the bristles, for example by expanding into a preformed expansion chamber. Thus, the reduction in jetting pressure will be not significant. For using the flow of the cleaning agent, the bristles can be connected to an actuator, which actuates when the jet flows past it. For example, the base of the bristles can be elastically connected to a wall of the conduit and pass through the wall into the cleaning agent inside of the conduit. The force of the flow of the cleaning agent in the conduit may cause the bristles to tilt as the flow starts. When the cleaning agent is forced through the conduit it pushes the base of the bristles in the flow direction and causes the bristles close to the jetting opening to rotate away from the orifice of the nozzle. Thus, the jet of emitted cleaning agent is almost not disturbed in any way, and no energy of the jet is lost on moving the bristles.

In an embodiment, the first bristle set comprises a first bristle and a first bearing connecting the first bristle to the platen, and the first bearing is made of an elastic material and/or comprises a hinge for facilitating the actuation of the first bristle set from the first configuration to the second configuration.

The flexibility enabling the bristles to be actuated from the first configuration to the second configuration can also come from the design of the connection of the bristle set to the platen. The bristle set can comprise a bearing, which connects the bristles to the platen. The bearing can be made of an easily deformable material, or it can even comprise a hinged joint, which enables the bristles to easily rotate away from the nozzle. An elastic element like a spring can be used to actuate the bristles back from the second configuration to the first configuration when the jet is stopped. As an alternative, portions of the bristles closer to the platen can be made of a more elastic material than portions of the bristles farther from the platen, so that the more elastic portion may serve as bearing allowing movement from the first to the second configuration.

In an embodiment, the brush head further comprises a second bristle set extending from the first face of the platen for brushing the teeth and comprising a second bristle and a second bearing connecting the second bristle to the platen. The first bristle set is positioned closer to the nozzle than the second bristle set, and the second bearing is configured for providing a more rigid connection to the platen than the first bearing.

The brush head can further comprise one or more second bristle sets, which are not configured for being actuated. They can be rigidly, or at least more rigidly, connected to the platen of the brush head than the first bristle sets. As the second bristle sets can be positioned farther away from the nozzle, they do not contribute to the covering of the nozzle. Therefore, there is no need to actuate them. These second bristle sets contribute to providing a dense bristle field of the brush head in the first configuration.

In an embodiment, the nozzle has a temporarily extendable portion, the orifice for emitting the cleaning agent is located at a tip of the temporarily extendable portion of the nozzle, the nozzle with the temporarily extendable portion is configured for extending its length when emitting the cleaning agent from the orifice of the nozzle, and the temporarily extendable portion of the nozzle is configured for actuating the first bristle set from the first configuration to the second configuration.

Instead of or in addition to moving the bristles away for clearing a path of the emitted cleaning agent or a path of the orifice, the position of the orifice can be changed for emitting of the cleaning agent.

A first exemplary variant of this embodiment may use a telescope nozzle formed of rigid elements. A telescope nozzle with at least two rigid and easily gliding telescope elements is used to maximize the use and primary function of the bristle field, i.e. the bristle coverage and bristle dynamics to clean efficiently. The telescopically extending nozzle driven by the cleaning agent can be integrated in the brush head platen in between the bristles. Once jetting is activated, the telescopically arrange elements shoot out of the platen to form a nozzle. Once jetting is stopped, the telescope elements are either passively, for example through bristle motion or gravity, or actively, for example if telescope elements are connected to a spring or elastic element, pulled back into the platen. The second variant may use an ultrathin extendable elastic membrane nozzle with self-opening/closing pinholes. The membrane can be integrated in the platen in between the bristles. A pressure of the cleaning agent forces the membrane to elongate by erecting or unrolling. The ultrathin membrane can be regarded as a bristle lining element and shoots out of the platen to form a nozzle. Then, the ultrathin membrane nozzle can adapt to the bristle layout and conforms to the adjacent pattern of bristles. To be able to push the membrane easier through the bristles, a special coating or lubricant can be applied to the bristles in close vicinity to the membrane and/or to the inflatable membrane. Also the membrane can be made of a low friction material like silicone oil coated rubber or fluoro-elastomers. As the adjacent bristle layout can restrict the membrane from expanding laterally, the nozzle geometry can be partially determined by the effective and directional stiffness of the bristle layout. If the pressure of the cleaning agent and thus the jetting is stopped, the elastic membrane nozzle can spring back in its initial shape. In this embodiment, the nozzle is extending at each jet burst, in that manner making way for the jet and eventually pushing aside splayed bristles disturbing the jet. The nozzle orifice can be made of a stiff material to control the jet characteristics well, and there is no need to integrate a hinge function to the bristles. Further, no permanent nozzle inside of the bristle field is required in this embodiment.

According to another aspect, there is provided an oral cleaning device comprising a brush head according to any of the preceding claims and a support unit.

The brush head can be connected to a support unit. This support unit can act as a handle, where a user of the oral cleaning device can hold and guide it. The support unit can comprise a drive unit for enabling a brushing motion of the brush head, and it can further comprise a storage tank containing cleaning agent and a pumping mechanism for pumping the cleaning agent to the nozzle. The support unit can further comprise a mechanism to activate the emission of cleaning agent, and a mechanism to activate the actuator for moving the bristles.

According to yet another aspect, there is provided a method for cleaning teeth with a combination of brushing and emitting of a cleaning agent. The method comprising the steps of brushing teeth with a first bristle set extending from a first face of a platen of a brush head in a first configuration, actuating the first bristle set from the first configuration to a second configuration for moving at least a part of the first bristle set away from a nozzle and/or away from a path of the cleaning agent when being emitted by an orifice of the nozzle and/or of the orifice, and emitting the cleaning agent from the orifice towards a direction pointing away from the first face of the platen.

Pursuant to the method for cleaning teeth with a combination of brushing and emitting of a cleaning agent, the teeth are brushed with the bristles of the brush head extending from the platen. In this step, the bristles are in a first configuration, where they can cover the nozzle to provide a dense bristle field for optimized brushing. The bristles are actuated from the first configuration to the second configuration, and at least a part of the bristles is moved away from the nozzle or away from a path of an orifice or of the cleaning agent. In the next step, the cleaning agent is emitted from the orifice of the nozzle along the path.

In an embodiment, the method further comprises the steps of activating the nozzle for an emission of the cleaning agent from the orifice; pushing the first bristle set from the first configuration into the second configuration by the cleaning agent emitted from the nozzle; and/or changing a geometry of at least a part of the nozzle, contacting the first bristle set with at least the part of the nozzle, and mechanically moving the first bristle set from the first configuration into the second configuration; and/or actuating the first bristle set from the first configuration into the second configuration by an actuator.

The method can be modified by additional steps. One step is the activation of the nozzle for the emission of the cleaning agent. The activation of the nozzle can result in the formation of a jet of cleaning agent emitted from the orifice of the nozzle, which jet hits the bristles and pushes the bristles from the first configuration away from the path of the cleaning agent into the second configuration. The activation of the nozzle can also comprise a change of the geometry of the nozzle. This change of geometry can be induced by the emitted cleaning agent, and can result in a dislocation of the bristles, as they are contacted by at least a part of the nozzle and are moved with the change of geometry of the nozzle. Alternatively, the bristles can also be actuated by an actuator, which changes the position or direction of the bristles with respect to the nozzle or the path of the cleaning agent. This actuator can be driven by the cleaning agent before or after it is emitted from the orifice, or it can be driven independently of the cleaning agent.

According to a further aspect there is provided a method for configuring a brush head having a platen with a first face, a first bristle set extending from the first face for brushing the teeth, and a nozzle comprising an orifice for emitting the cleaning agent from the orifice towards a direction pointing away from the first face of the platen, the method comprising: moving at least a part of the first bristle set relative to a path of the cleaning agent from the orifice, thereby to cause the brush head to adopt either a first configuration in which the at least part of the first bristle set is at least partially blocking the path; or a second configuration in which the path is clear.

The first configuration may be adopted prior to brushing, in which case the blocking of the path by the first bristle set may assist to improve brushing efficacy during brushing.

The benefits provided by any of the above aspects equally apply to all of the other aspects and vice versa.

In a gist, the invention relates to a brush head for an oral cleaning device for cleaning teeth with a combination of brushing and emitting of a cleaning agent. The brush head comprises a bristle set for brushing the teeth and a nozzle for emitting the cleaning agent. When actuating the bristle set from a first configuration, which is optimized for brushing, to a second configuration, which is optimized for emitting of a cleaning agent, at least a part of the bristle set is moved away from the nozzle and/or away from a path of the cleaning agent when being emitted from an orifice of the nozzle.

The above aspects and embodiments will become apparent from and be elucidated with reference to the exemplary embodiments described hereinafter. Exemplary embodiments will be described in the following with reference to the following drawings:

DETAILED DESCRIPTION OF EMBODIMENTS

Figure 1:
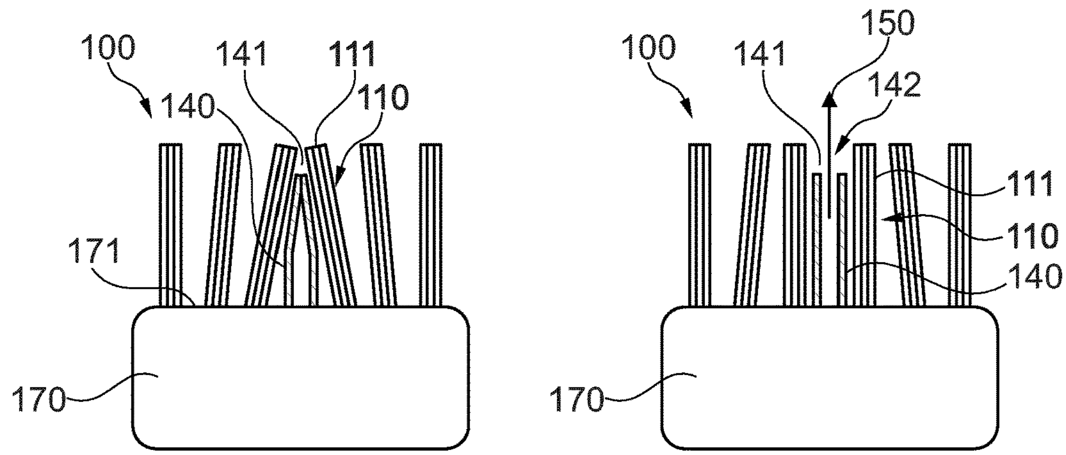
FIG. 1 shows a schematic set-up of a brush head in the first and the second configuration according to a first exemplary embodiment.

FIG. 1 shows a schematic set-up of a brush head 100 for an oral cleaning device in the first and the second configuration according to a first exemplary embodiment. The platen 170 comprises a first face 171. On the first face, a first bristle set 110 with a first bristle 111 is connected to the platen 170 and extends from the first face. A nozzle 140 is located adjacent to the first bristle set 110 and comprises an orifice 141 for emitting cleaning agent 150 towards a direction pointing away from the first face 171 of the platen 170. While the left drawing shows the first configuration with the bristle 111 covering the nozzle 140, the right drawing shows the second configuration with the bristle 111 being moved aside by an opening movement of the nozzle and a cleaning agent 150 is emitted from the orifice 141 of the nozzle 140 along the path 142. In other words, at least a part of the first bristle set 110, in this example the tips of the bristles, is moved away from the path 142 of the cleaning agent 150 when being emitted from the orifice. The nozzle 140 is activated for the emission of the cleaning agent 150, enlarges its cross-section, and pushes away the tips of the bristles from the first into the second configuration. When the emission of the cleaning agent 150 stops, the nozzle is deactivated and reduces its cross-section, such that the tips of the bristles are enabled to move elastically back from the second into the first configuration towards the path 142 of the cleaning agent 150, where the cleaning agent 150 has been emitted.

Figure 2:
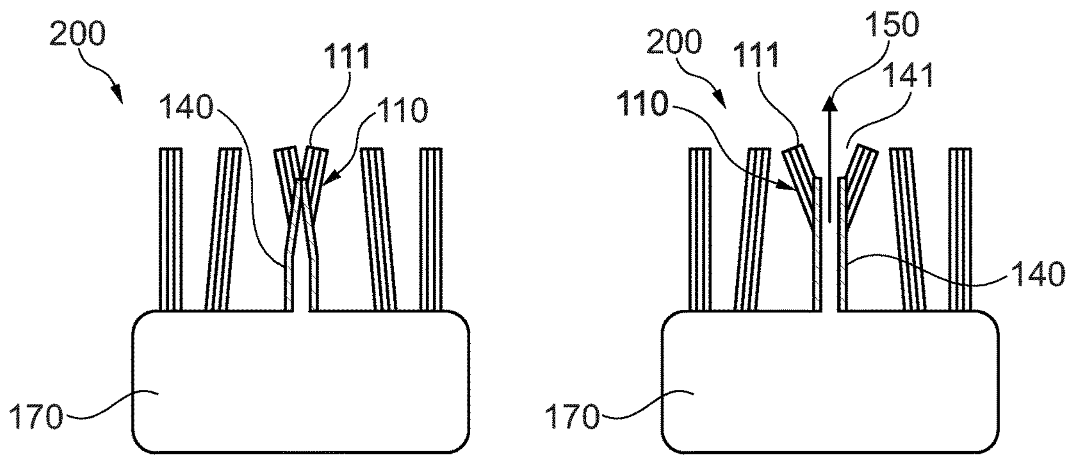
FIG. 2 shows a schematic set-up of a brush head in the first and the second configuration according to a second exemplary embodiment.

FIG. 2 shows a schematic set-up of a brush head 100 in the first and the second configuration according to a second exemplary embodiment. This brush head is similar to the brush head of FIG. 1, but in this embodiment, the first bristle set 110 is mounted on the nozzle 140. The opening of the nozzle 140 in the right drawing moves away the first bristle 111 and clears the path 142 for emitting the cleaning agent 150.

Figure 3:
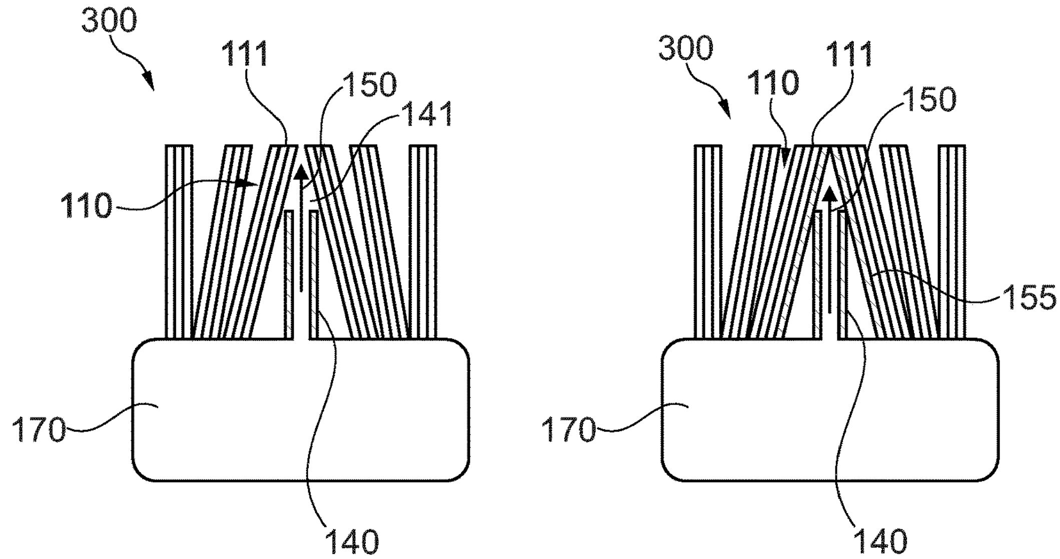
FIG. 3 shows schematic set-ups of two examples of a brush head according to a third exemplary embodiment.

FIG. 3 shows schematic set-ups of two examples of a brush head 100 according to a third exemplary embodiment. In this embodiment, the bristle 111 is pushed aside by the cleaning agent 150 jet emitted from the nozzle 140 (left drawing). In the right drawing, an additional flexible flap 155 lining the first bristle 111 is depicted, which is used to transfer the force from the jet of cleaning agent 150 to the first bristle 111.

Figure 4:
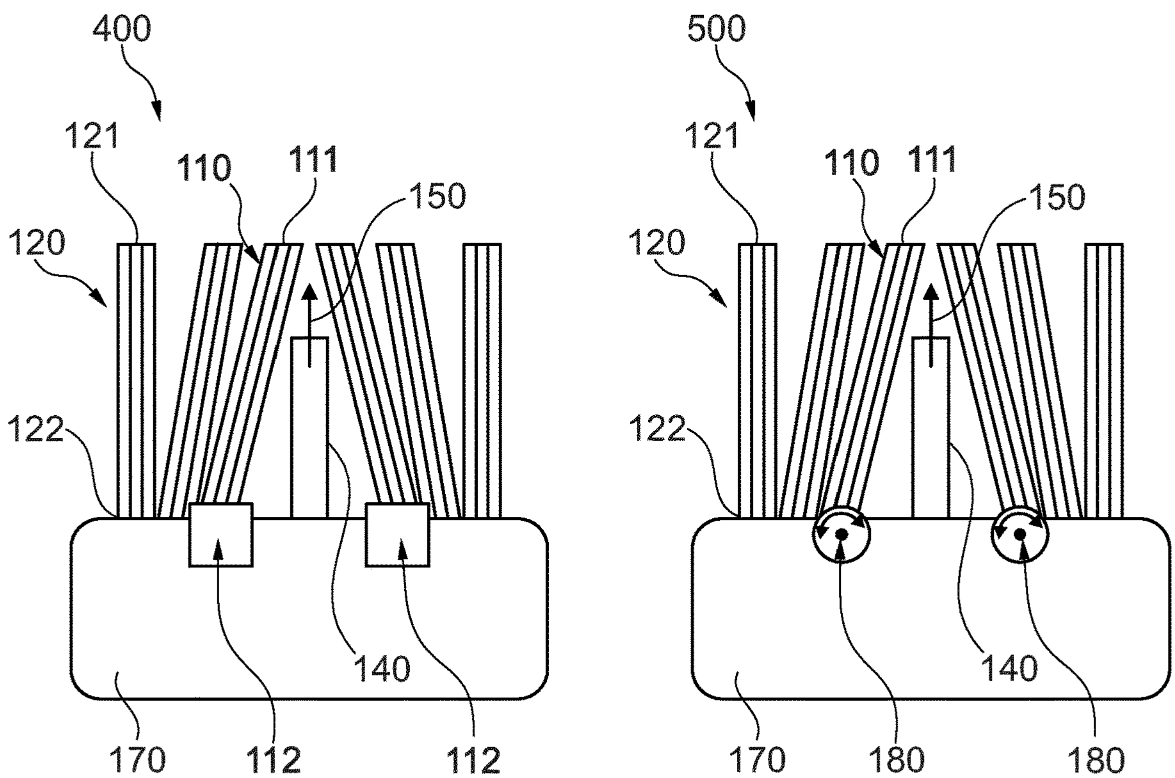
FIG. 4 shows schematic set-ups of a brush head according to a fourth and a fifth exemplary embodiment.

FIG. 4 shows schematic set-ups of a brush head 100 according to a fourth and a fifth exemplary embodiment. The first bristle set 110 comprises a bearing 112 connecting the first bristle 111 to the platen 170. The bearing can be made of an elastic or deformable material as shown in the left drawing, or it can comprise a hinge 180 as shown in the right drawing. As an alternative, a portion of the bristles close to the platen can be made of a more elastic material than other portions of the bristles, so that the bristles can bend at these more elastic portions.

Figure 5:
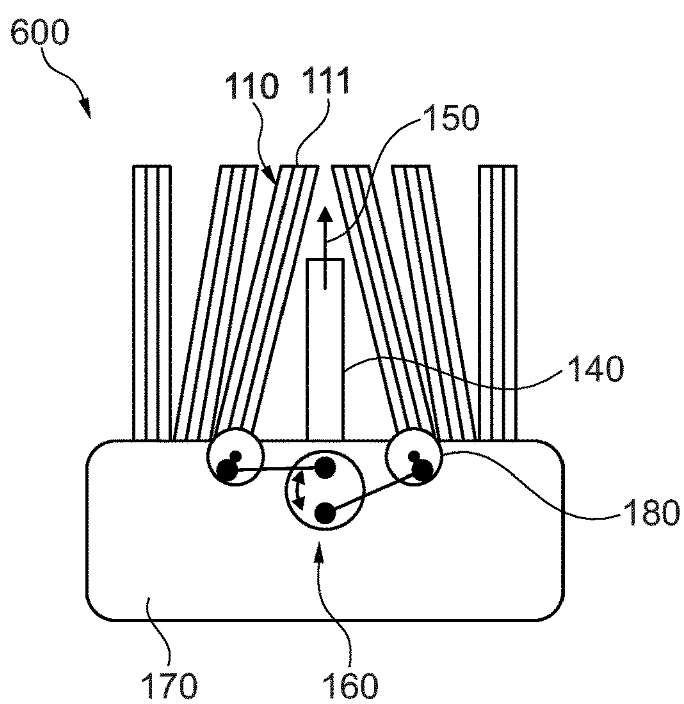
FIG. 5 shows a schematic set-up of a brush head in the first configuration according to a sixth exemplary embodiment.

FIG. 5 shows a schematic set-up of a brush head 100 in the first configuration according to a sixth exemplary embodiment. An actuator 160 is connected to a hinge 180. The actuator is configured to actuate the first bristle set 110 from the first to the second configuration, such that cleaning agent 150 can be emitted along the path 142 in front of the nozzle 140. The actuator may be driven by a flow or a pressure of the cleaning agent 150, or by electricity. As an alternative, the actuator may be driven by a manual activation by the user, e.g. by actuating a lever at a tooth brush grip.

Figure 6:
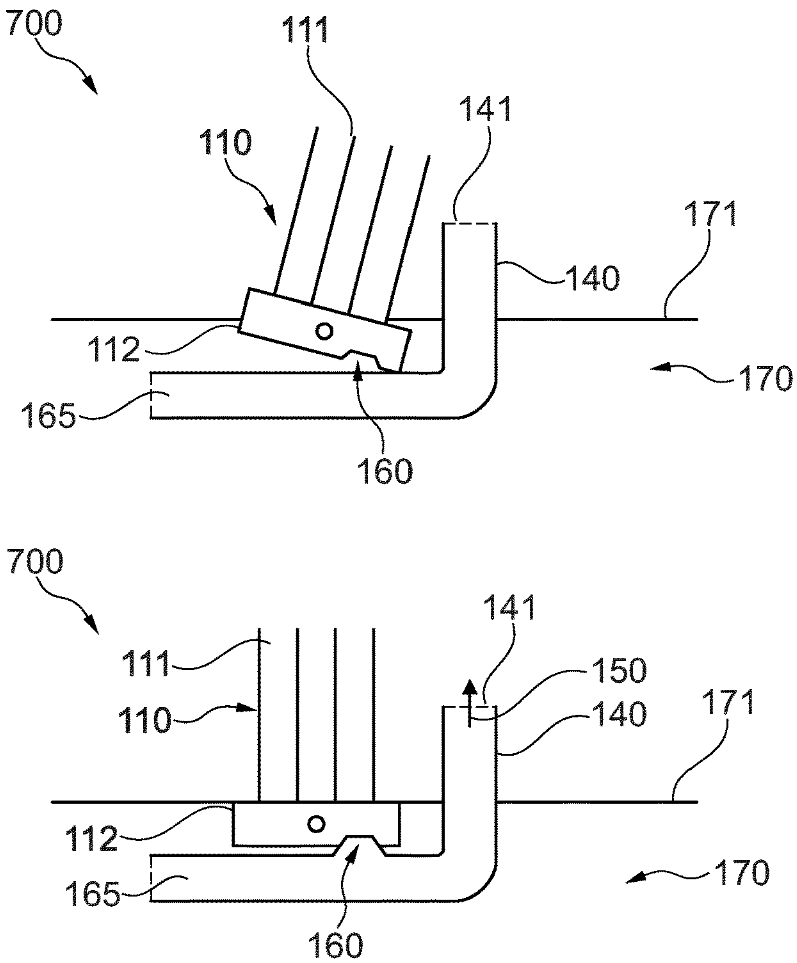
FIG. 6 shows a schematic set-up of a brush head in the first and the second configuration according to a seventh exemplary embodiment.

FIG. 6 shows a schematic set-up of a brush head 100 in the first and the second configuration according to a seventh exemplary embodiment. The actuator 160 is driven by the pressure of the cleaning agent 150 in a conduit 165. When the conduit is pressurized, the actuator 160 in form of a small elastic balloon expands and pushes against the first bearing 112 of the first bristle set 110, as can be seen in the second drawing of FIG. 6. Cleaning agent 150 can be emitted through the orifice 141 of the nozzle 140 through the cleared path 142. Instead of a balloon any other pressure expandable element can be used.

Figure 7:
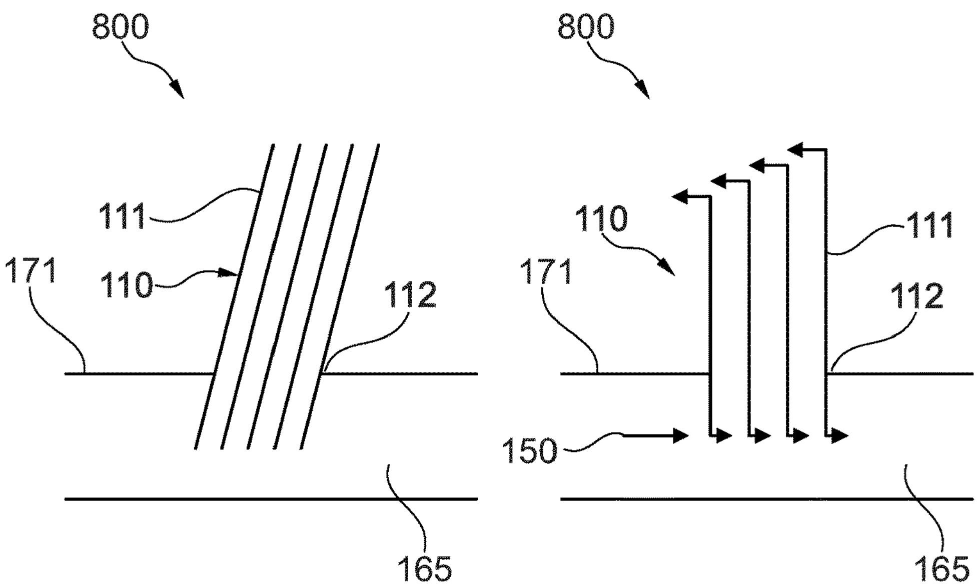
FIG. 7 shows a schematic set-up of a brush head in the first and the second configuration according to an eighth exemplary embodiment.

FIG. 7 shows a schematic set-up of a brush head 100 in the first and the second configuration according to an eighth exemplary embodiment. The actuator 160 is driven by a flow of the cleaning agent 150 in the conduit 165. The bristles of the first bristle set 110 are passing within a first bearing 112 through a wall of the conduit 165 and extend into the cleaning agent 150. In this embodiment, the bristles have to be stiffer than the bearing so that the cleaning agent 150 acting on the bristle portion in the conduit can move the bristle portion outside the conduit, i.e. the bristle portions extending from the platen. The flow of the cleaning agent 150 when emitting a jet through the nozzle 140 effects a force on the lower part of the bristles or on the bearing 112 of the first bristle set 110 and causes the bristles to move away from the nozzle 140 to clear the path 142.

Figure 8:
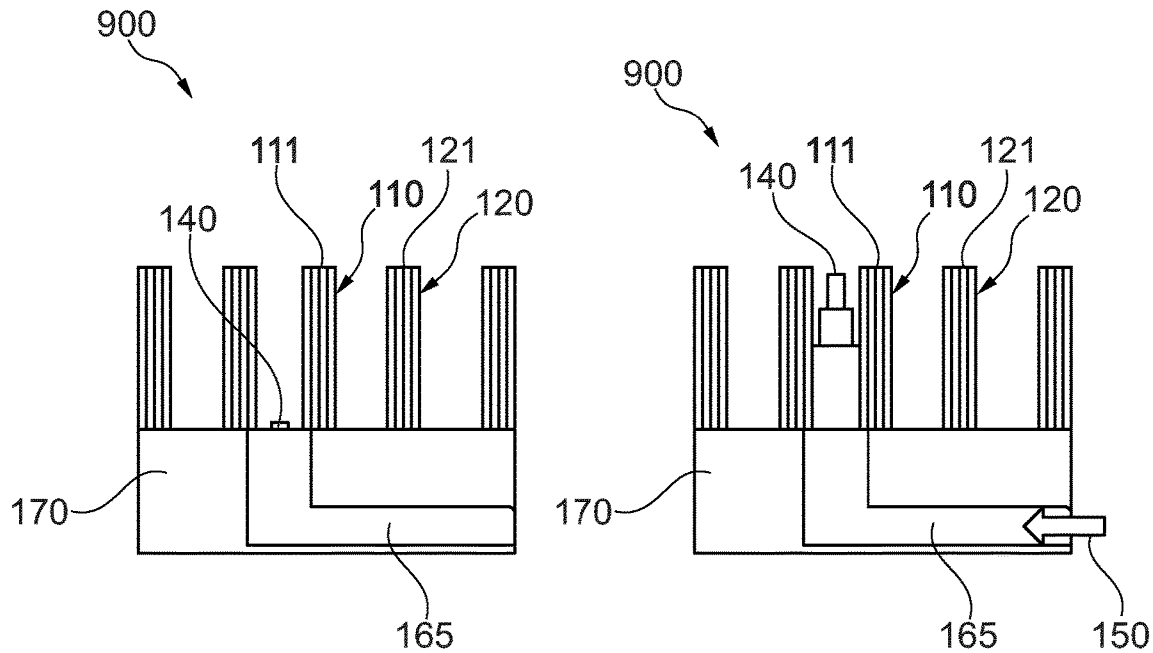
FIG. 8 shows a schematic set-up of a brush head in the first and the second configuration according to a ninth exemplary embodiment.

FIG. 8 shows a schematic set-up of a brush head 100 in the first and the second configuration according to a ninth exemplary embodiment. The nozzle 140 is an extendable nozzle, which is integrated into the platen 170 and extends telescopically if cleaning agent 150 is emitted through the extendable nozzle. The nozzle 140 can push bristles or even splayed bristles of the first bristle 110 away when extending and provide an undisturbed jet of cleaning agent 150 in close proximity to the teeth.

Figure 9:
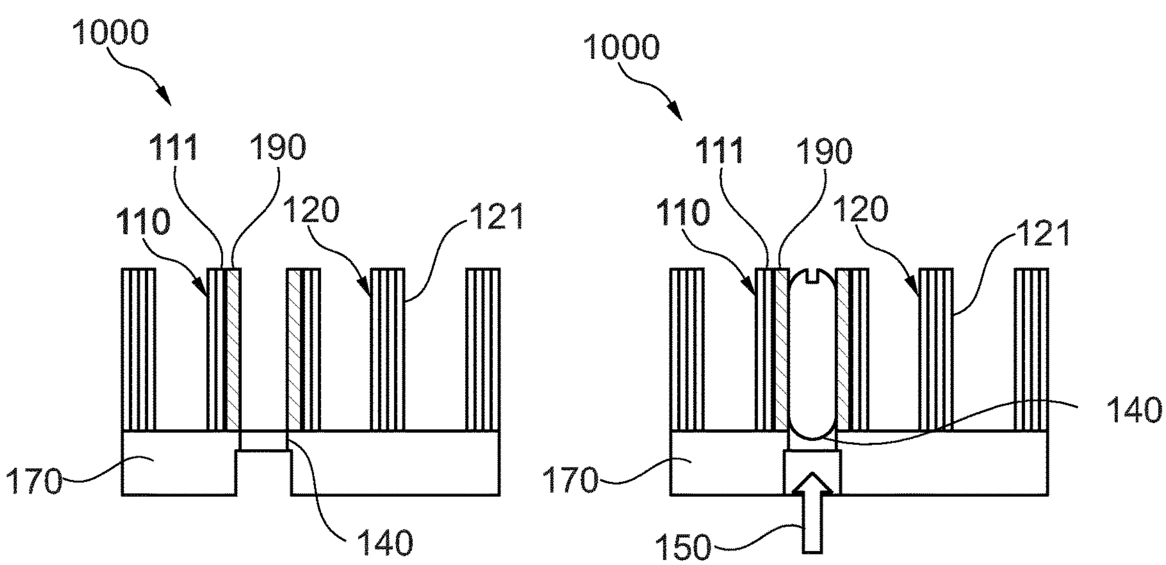
FIG. 9 shows a schematic set-up of a brush head in the first and the second configuration according to a tenth exemplary embodiment.

FIG. 9 shows a schematic set-up of a brush head 100 in the first and the second configuration according to a tenth exemplary embodiment. The nozzle 140 in this embodiment is an extendable nozzle made of an elastic membrane. The extendable nozzle enlarges or enrolls when cleaning agent 150 is emitted through the nozzle 140. The first bristle set 110 adjacent to the extendable nozzle can be lined with a low-friction coating 190 for enabling a smooth extension of the nozzle 140.

Figure 10:
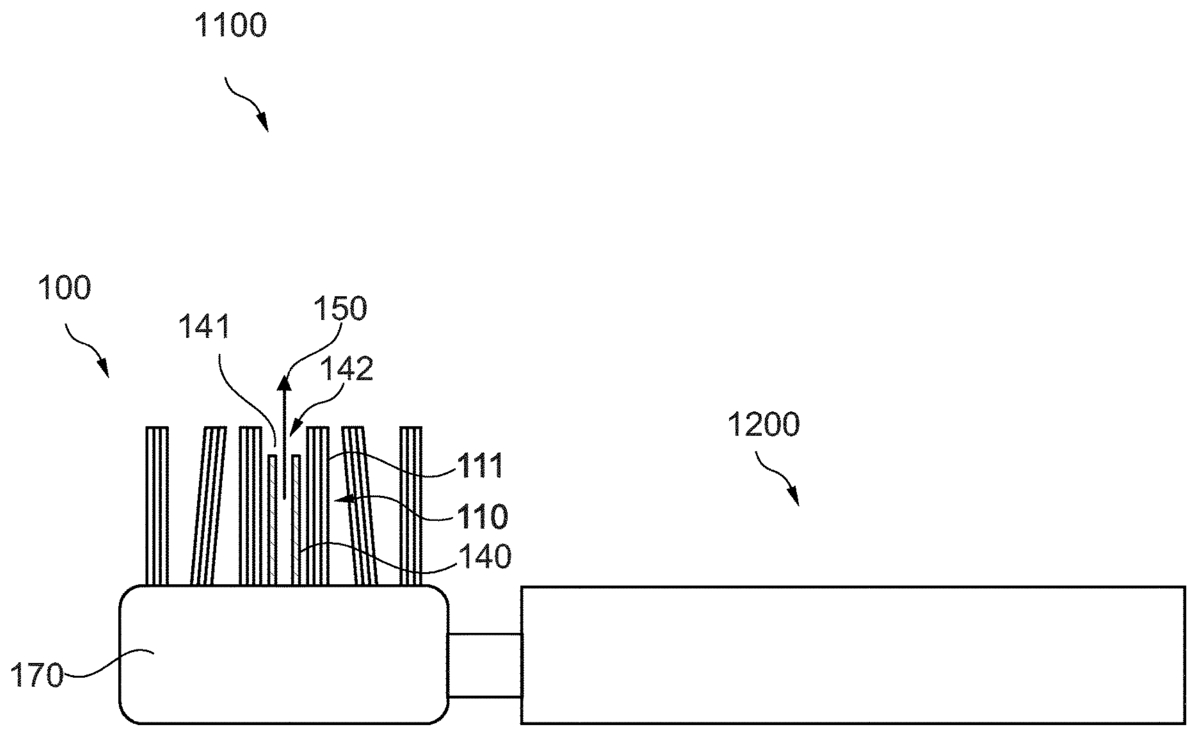
FIG. 10 shows a schematic set-up of an oral cleaning device comprising a brush head and a support unit.

FIG. 10 shows a schematic set-up of an oral cleaning device 1100 comprising a brush head 100 and a support unit 1200. The support unit 1200 can be a handle, and it can comprise a drive unit for a brushing motion of the brush head, a storage tank containing cleaning agent 150, and a pumping mechanism for boosting the cleaning agent 150.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. The mere fact that certain measures are re-cited in mutually different dependent claims does not indicate that a combination of these measures cannot be used to advantage. Any reference signs in the claims should not be construed as limiting the scope.

LIST OF REFERENCE SIGNS

100 brush head according to a first embodiment
110 first bristle set
111 first bristle
112 first bearing
120 second bristle set
121 second bristle
122 second bearing
140 nozzle
141 orifice
142 path
150 cleaning agent
155 flexible flap
160 actuator
165 conduit
170 platen
171 first face
180 hinge
190 coating
200 brush head according to a second embodiment
300 brush head according to a third embodiment
400 brush head according to a fourth embodiment
500 brush head according to a fifth embodiment
600 brush head according to a sixth embodiment
700 brush head according to a seventh embodiment
800 brush head according to an eighth embodiment
900 brush head according to a ninth embodiment
1000 brush head according to a tenth embodiment
1100 oral cleaning device
1200 support unit

The invention claimed is:

1. A brush head for an oral cleaning device for cleaning teeth with a combination of brushing and emitting of a cleaning agent, the brush head comprising:

a platen with a first face, a first bristle set extending from the first face for brushing the teeth, a nozzle extending from the first face comprising an orifice for emitting the cleaning agent from the orifice towards a direction pointing away from the first face of the platen, and an actuator for moving at least a part of the first bristle set relative to a path of the cleaning agent from the orifice such that the brush head is configurable to adopt a first configuration in which the path is at least partially blocked by said at least part of the first bristle set, and a second configuration in which the path is cleared of said at least part of the first bristle set.

2. The brush head of claim 1, wherein the actuator is configured for brushing the teeth in the first configuration, and wherein the brush head is configured for emitting the cleaning agent in the second configuration.

3. The brush head of claim 1, wherein the actuator comprises a flexible flap between the nozzle and the first bristle set, and wherein the orifice of the nozzle is oriented towards the flexible flap, so that the flexible flap is configured for transferring a momentum from the cleaning agent emitted from the orifice to the first bristle set.

4. The brush head of claim 1, wherein the nozzle is configured for changing its geometry for emitting the cleaning agent.

5. The brush head of claim 4, wherein the first bristle set is configured for being actuated from the first configuration to the second configuration by the change of the geometry of the nozzle.

6. The brush head of claim 1, wherein the first bristle set is configured for being pushed away by the nozzle.

7. The brush head of claim 1, wherein the first bristle set is positioned on a changeable geometry of the nozzle and configured for being moved with the change of geometry of the nozzle.

8. The brush head of claim 1, wherein the nozzle has a temporarily extendable portion, wherein the orifice for emitting the cleaning agent is located at a tip of the temporarily extendable portion of the nozzle, wherein the nozzle with the temporarily extendable portion is configured for extending its length when emitting the cleaning agent from the orifice of the nozzle, and wherein the temporarily extendable portion of the nozzle is configured for actuating the first bristle set from the first configuration to the second configuration.

9. The brush head of claim 1, wherein the actuator is one of an electrically driven actuator and an actuator driven by a pressure and/or a flow of the cleaning agent in a conduit delivering the cleaning agent to the nozzle.

10. The brush head of claim 1, wherein the first bristle set comprises a first bristle and a first bearing connecting the first bristle to the platen, and wherein the first bearing is made of an elastic material and/or comprises a hinge for facilitating the actuation of the first bristle set from the first configuration to the second configuration.

11. The brush head of claim 10, wherein the brush head further comprises a second bristle set extending from the first face of the platen for brushing the teeth and comprising a second bristle and a second bearing connecting the second bristle to the platen, wherein the first bristle set is positioned closer to the nozzle than the second bristle set, and wherein the second bearing is configured for providing a more rigid connection to the platen than the first bearing.

12. An oral cleaning device, comprising:

a brush head according to claim 1 and a support unit.

13. The brush head of claim 6, wherein the brush head is configured for actuating the first bristle set from the first configuration into the second configuration by moving at least part of the nozzle away from the platen.

14. A brush head for an oral cleaning device for cleaning teeth with a combination of brushing and emitting of a cleaning agent, the brush head comprising:

a platen with a first face;

a first bristle set extending from the first face for brushing the teeth;

a nozzle comprising a temporarily extendable portion and an orifice for emitting the cleaning agent from the orifice towards a direction pointing away from the first face of the platen, wherein the orifice for emitting the cleaning agent is located at a tip of the temporarily extendable portion of the nozzle and the nozzle with the temporarily extendable portion is configured for extending its length when emitting the cleaning agent from the orifice of the nozzle; and an actuator for moving at least a part of the first bristle set relative to a path of the cleaning agent from the orifice such that the brush head is configurable to adopt a first configuration in which the path is at least partially blocked by said at least part of the first bristle set, and a second configuration in which the path is cleared of said at least part of the first bristle set, wherein the temporarily extendable portion of the nozzle is configured for actuating the first bristle set from the first configuration to the second configuration.

15. The brush head of claim 14, wherein the actuator is configured for brushing the teeth in the first configuration, and wherein the brush head is configured for emitting the cleaning agent in the second configuration.

16. The brush head of claim 14, wherein the actuator comprises a flexible flap between the nozzle and the first bristle set, and wherein the orifice of the nozzle is oriented towards the flexible flap, so that the flexible flap is configured for transferring a momentum from the cleaning agent emitted from the orifice to the first bristle set.

17. The brush head of claim 14, wherein the first bristle set is configured for being pushed away by the nozzle.

18. The brush head of claim 14, wherein the actuator is one of an electrically driven actuator and an actuator driven by a pressure and/or a flow of the cleaning agent in a conduit delivering the cleaning agent to the nozzle.

19. The brush head of claim 14, wherein the brush head is configured for actuating the first bristle set from the first configuration into the second configuration by moving at least part of the nozzle away from the platen.

* * * * *